(12) United States Patent
Dolgunov et al.

(10) Patent No.: US 7,979,628 B2
(45) Date of Patent: Jul. 12, 2011

(54) RE-FLASH PROTECTION FOR FLASH MEMORY

(75) Inventors: Boris Dolgunov, Ramat Gan (IL); Arseniy Aharonov, Arad (IL)

(73) Assignee: SanDisk IL Ltd., Kfar Saba (IL)

( * ) Notice: Subject to any disclaimer, the term of this patent is extended or adjusted under 35 U.S.C. 154(b) by 365 days.

(21) Appl. No.: 12/252,930

(22) Filed: Oct. 16, 2008

(65) Prior Publication Data

US 2009/0113117 A1  Apr. 30, 2009

(30) Foreign Application Priority Data

Oct. 30, 2007 (IL) .......................... 187036

(51) Int. Cl.
*G06F 12/00* (2006.01)
*G06F 13/00* (2006.01)
*G06F 13/28* (2006.01)

(52) U.S. Cl. ........ 711/103; 711/161; 711/162; 711/163; 711/E12.093; 711/E12.103; 711/E12.008

(58) Field of Classification Search ................. 711/103, 711/161, 162, 163, E12.093, E12.103, E12.008
See application file for complete search history.

(56) References Cited

U.S. PATENT DOCUMENTS

| | | | | |
|---|---|---|---|---|
| 6,438,048 | B1 * | 8/2002 | Kumar ........................ | 365/201 |
| 6,636,971 | B1 | 10/2003 | Loukianov | |
| 2005/0050342 | A1 | 3/2005 | Boivie et al. | |
| 2006/0107032 | A1 * | 5/2006 | Paaske et al. ..................... | 713/2 |
| 2007/0061897 | A1 | 3/2007 | Holtzman et al. | |
| 2007/0067644 | A1 | 3/2007 | Flynn et al. | |
| 2007/0073416 | A1 | 3/2007 | Grawrock | |
| 2007/0130470 | A1 | 6/2007 | Blom et al. | |
| 2008/0115210 | A1 * | 5/2008 | Hirota et al. ................... | 726/20 |

FOREIGN PATENT DOCUMENTS

WO  WO-2007062941  6/2007

OTHER PUBLICATIONS

"DS2423 4kbit I-Wire RA\m with Counter" [Online] Sep. 6, 2007, XP002515497 Retrieved from the Internet: URL: http://www.maximic.com/quick view2.cfill/qv pk/2912> [retrieved on Feb. 17, 2009] Section Description.
Boris Dolgunov, et al., "Enabling Optimal Security for Removable Storage Devices", Security in Storage Workshop, 2007, SISW '07, Fourth International IEEE, Piscataway, NJ, USA, Sep. 1, 2007, pp. 15-21.
Schneier B, et al., Applied Cryptography, Second Edition, Protocols Algorithms, and Source Code in C, John Wiley and Sons, Inc. New York, Jan. 1, 1996, pp. 52-56.
International Search Report and Written Opinion for PCT/IL2008/001386, dated Mar. 4, 2009, 15 pages.
International Preliminary Report on Patentability for PCT/IL2008/001386, dated May 14, 2010, 9 pages.

* cited by examiner

*Primary Examiner* — Sheng-Jen Tsai
(74) *Attorney, Agent, or Firm* — Brinks Hofer Gilson & Lione (57) ABSTRACT

A method for storing data includes providing a memory package including an integrated circuit containing a non-volatile memory and counter circuitry. The data is written to the non-volatile memory. The counter circuitry is operated to maintain a count of write operations performed on the non-volatile memory. The data and the count from the memory package are received at a controller, separate from the memory package, and the data is authenticated in response to the count.

6 Claims, 6 Drawing Sheets

RE-FLASH PROTECTION FOR FLASH MEMORY

FIELD OF THE INVENTION

The present invention relates generally to data storage, and particularly to protection of the data stored.

BACKGROUND OF THE INVENTION

An increasingly important object of data storage is protecting the integrity of the stored data. For example, a play-counter of a digital rights management system may be used to count, and limit, the number of times a song is played. Circumventing the counter may allow unlimited playing of the song, so that protection of the counter against corruption is essential While apparatus and methods for protection of stored data are known in the art, an improved system for the protection would be advantageous.

SUMMARY OF THE INVENTION

Various embodiments of the present invention may include an apparatus and a method for storing data in a safeguarded manner. In some embodiments the apparatus and the method typically comprise a controller package and a separate memory package, herein also referred to as a controller and a memory. The two packages may be connected by a communication bus and are typically mounted on a printed circuit board. In one embodiment the controller package may comprise a secret key and an authentication engine. In some embodiments the memory package may comprise an integrated circuit having a non-volatile memory (NVM), which is typically flash memory. The integrated circuit may also comprise write-cycle counter circuitry, which is typically implemented as a finite state machine.

In a disclosed embodiment the circuitry may provide a count of the number of write operations made to each block of the NVM, and the values of the counts may be stored in the NVM. To write data to a block of the NVM, the controller package typically initially requests a current write-cycle count of the block from the NVM. The controller may operate the authentication engine to calculate an authentication signature for the block, using the secret key and the data concatenated with an incremented write-cycle count. The controller may then send the authentication signature and the data to the NVM, wherein they are written. The write-cycle counter circuitry typically increments the write-cycle count, and the incremented value replaces the prior count stored in the NVM.

In a further disclosed embodiment, to read the data from the block, the controller may retrieve the current write-cycle count from the memory package. The controller may also retrieve the authentication signature and the data stored in the block. The controller's authentication engine calculates an assumed block signature for the block using the secret key, the data, and the write-cycle count. The controller may compare the assumed and retrieved signatures, and, if they are identical, the read data may be assumed to be correct. If the two signatures are not identical, the read data may be considered to be suspect.

By using the count of write operations to authenticate the read data, the controller is able to detect in a simple manner if unauthorized write operations have been performed on the NVM. By incorporating the counter circuitry in the memory package, there is no need to modify existing controllers, nor to use controller memory, which is typically limited and expensive, to maintain the write-cycle counts.

In an alternative embodiment of the present invention, data transferred between the controller and the memory may be encrypted during the transfer. In a further alternative embodiment, the safeguarded data is stored in an encrypted form.

In a yet further alternative embodiment, the controller may comprise a random number generator. The generator is used to provide a random number to the memory, which uses the random number to transfer the write-cycle count to the controller in a secure form. The secure form may be decoded by the controller, and typically protects the write-cycle count from being read by entities other than the controller.

There is therefore provided, according to an embodiment of the present invention, apparatus for storing data, including:

a memory package including an integrated circuit, which circuit contains a non-volatile memory to which the data is written and counter circuitry which is configured to maintain a count of write operations performed on the non-volatile memory; and a controller, separate from the memory package, which is configured to receive the data and the count from the memory package, and to authenticate the data in response to the count.

Typically the controller is configured to receive a prior count of prior write operations from the memory package, to provide to the memory package a signature for the data in response to the prior count and the data, and to authenticate the data in response to the signature. Providing the signature to the memory package may include storing a copy of the signature in the memory package, and authenticating the data in response to the signature may include verifying that the copy and the signature are identical.

In one embodiment the controller is configured to provide a random number to the memory package, and the memory package is configured to transfer a function of the count, generated in response to the random number, to the controller. The memory package may be configured to generate a signature of the function and to transfer the signature with the function to the controller. The controller may be configured to authenticate the count in response to the signature and the function.

In a disclosed embodiment the counter circuitry is configured to store a value of the count in the non-volatile memory, the counter circuitry typically includes a finite state machine, and the non-volatile memory typically includes a flash memory.

In some embodiments the controller includes a secret key, and the controller is configured to generate a signature of the data in response to the secret key, and to authenticate the data in response to the signature.

In an alternative embodiment the controller is configured to perform encryption on the data so as to generate encrypted data, writing the data to the non-volatile memory includes storing the data in the non-volatile memory as the encrypted data, and receiving the data includes receiving the encrypted data and performing decryption on the encrypted data. The encryption and decryption may be symmetric. Alternatively, the encryption and decryption may be asymmetric.

In a further alternative embodiment the controller is configured to generate a signature of the data, and the memory package is configured as blocks of memory, and is configured to store the data and the signature in one block of the non-volatile memory.

Alternatively, the controller is configured to generate a signature of the data, and the memory package is configured as blocks of memory, and is configured to store the data and the signature in different blocks of the non-volatile memory.

At least one of the data and the count may be transferred between the controller and the memory package in a secure, typically encrypted, form.

There is further provided, according to an embodiment of the present invention, a method for storing data, including:

providing a memory package including an integrated circuit containing a non-volatile memory and counter circuitry;

writing the data to the non-volatile memory;

operating the counter circuitry to maintain a count of write operations performed on the non-volatile memory;

receiving at a controller, separate from the memory package, the data and the count from the memory package; and authenticating the data in response to the count.

The present invention will be more fully understood from the following detailed description of the embodiments thereof, taken together with the drawings, a brief description of which follows.

DETAILED DESCRIPTION OF EMBODIMENTS

Overview

A data storage system, typically formed on a printed circuit board (PCB), comprises two separate components: a controller package and a memory package. The two components are coupled by a communication bus.

The memory package comprises an integrated circuit containing a non-volatile memory (NVM), which is herein by way of example assumed to comprise a flash memory. However, embodiments of the present invention may use any convenient non-volatile memory. Data which is to be safeguarded is stored in blocks of the NVM. The integrated circuit also contains counter circuitry, typically a finite state machine, which maintains a count of the number of write operations performed on each block of the NVM.

In order to write data to the NVM, the controller package generates a signature for the data that is a function of the data, and of the count of write operations performed on the block where the data is to be stored. (The count has been previously written to the NVM.) The signature and the data are written to the NVM, and the stored value of the count is incremented.

To read data from the NVM, the stored data, the signature of the data, and the current count value are transferred to the controller package. The controller package calculates an assumed signature from the received data and the received count. The assumed signature is compared with the received signature, and if the two signatures are identical, the received data is assumed to be trustworthy.

Typically, data is stored in an encrypted form, and may be transferred between the controller and memory packages in the encrypted form. In some embodiments, the count is also transferred in a secure form.

System Description

Figure 1:
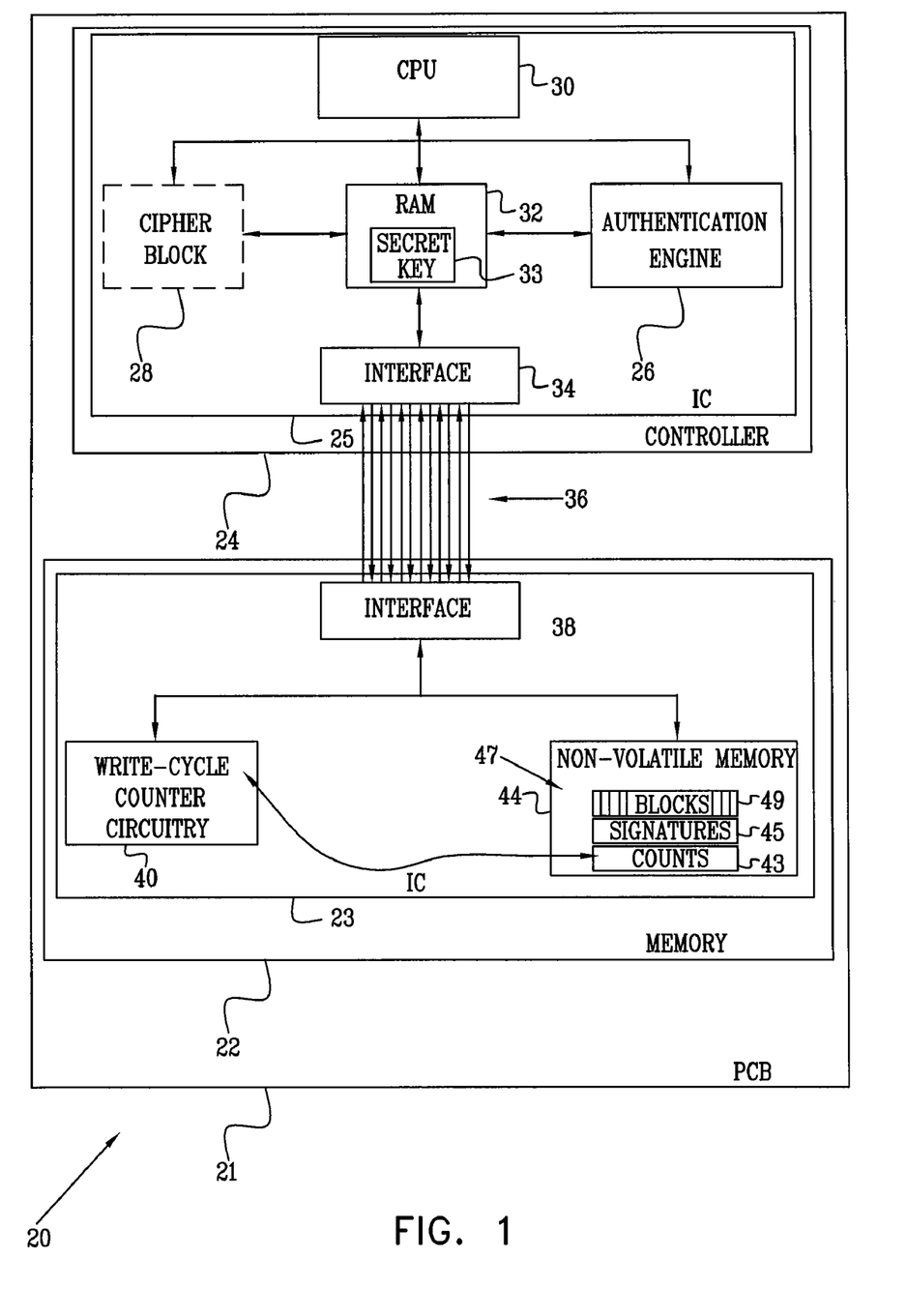
FIG. 1 is a schematic block diagram of a data storage apparatus, according to an embodiment of the present invention.

Reference is now made to FIG. 1, which is a schematic block diagram of data storage apparatus 20, according to an embodiment of the present invention. Apparatus 20 comprises a memory package 22, also herein termed a memory, and a controller package 24, also herein termed a controller. The two packages are typically mounted on a printed circuit board (PCB) 21 and are coupled by a communication bus 36 comprised in the PCB.

Controller 24 is typically formed as an integrated circuit (IC) 25. The controller comprises a central processing unit (CPU) 30 which, as described below, performs functions to read data from and write data to memory 22, and which controls the operation of apparatus 20. Controller 24 comprises a general purpose random access memory (RAM) 32 which, inter alia, is used to store instructions accessed by the CPU, as a data buffer, and to store a secret key 33.

Controller 24 also comprises an authentication engine 26, which operates an algorithm to generate a message authentication code (MAC). The MAC is used as a signature for data that is transferred with the MAC, and acts to authenticate and safeguard the validity of the transferred data. For data X, the algorithm generates a signature S, and the relation between S and X is written herein as S=MAC(X). The authentication engine may be implemented in hardware (H/W), software (S/W) wherein code is stored in RAM 32, or a mixture of hardware and software, and may be configured to be operated by, or independently of, the CPU. The algorithm may be any MAC algorithm known in the art, such as a one-key MAC (OMAC) algorithm, or a keyed-hash MAC (HMAC) algorithm.

Controller 24 optionally includes a cipher block 28, which, as for the authentication engine, may be implemented in H/W, S/W, or a mixture of the two. Hereinbelow, unless otherwise stated, apparatus 20 is assumed to include and operate cipher block 28. Cipher block 28 is used to encrypt and decrypt data transferred between controller 24 and memory 22. The optional property of cipher block 28, and of uses of the block, are indicated in the diagrams of the present application using broken perimeters around blocks referring to encryption and decryption.

Controller 24 includes an interface 34, which acts as a buffer and is used to transfer data between RAM 32 and bus 36.

Memory 22 comprises an IC 23. IC 23 in turn comprises non-volatile memory (NVM) 44, which may be any convenient type of non-volatile memory. Hereinbelow, by way of example, NVM 44 is assumed to comprise flash memory. Typically data written to the NVM is in different forms, including data 47 that is to be safeguarded and that is assumed to be written into blocks 49 of the NVM. Other data written to NVM 44 includes signatures 45 of the safeguarded data, and counts 43 of the number of times each block of the NVM having safeguarded data is written to. There is a respective signature 45 for each block of safeguarded data. There is also a respective count 43 for each block of NVM 44 to which safeguarded data is written. Typically, at the manufacturing stage of apparatus 20, the counts for all blocks are set to zero. For clarity, in the present application a suffix may be added to the identifiers of blocks 49, data 47, signatures 45 and counts 43 to identify specific blocks, data, signatures, and counts. Thus, a block 49A may be assumed to have data 47A, having a signature 45A, written to the block, and the number of write operations performed on block 49A is count 43A.

IC 23 includes an interface 38, which is generally similar in function and implementation to interface 34.

IC 23 also comprises write-cycle counter circuitry 40, which is typically implemented as a finite state machine. Circuitry 40 counts the number of times each block of NVM 44 is written to, and the counts are stored as block counts 43 in NVM 44. When a particular block is written to, the circuitry performs the count for the block by retrieving the value of the count for the block from counts 43, incrementing the value of the count, and replacing the value of the count with the incremented value in counts 43. Typically circuitry 40 is implemented in a physical location of IC 23 that is separate from the memory elements of NVM 44, and the elements of the counter circuitry are typically formed from elements that are different from those of the memory elements.

Figure 2:
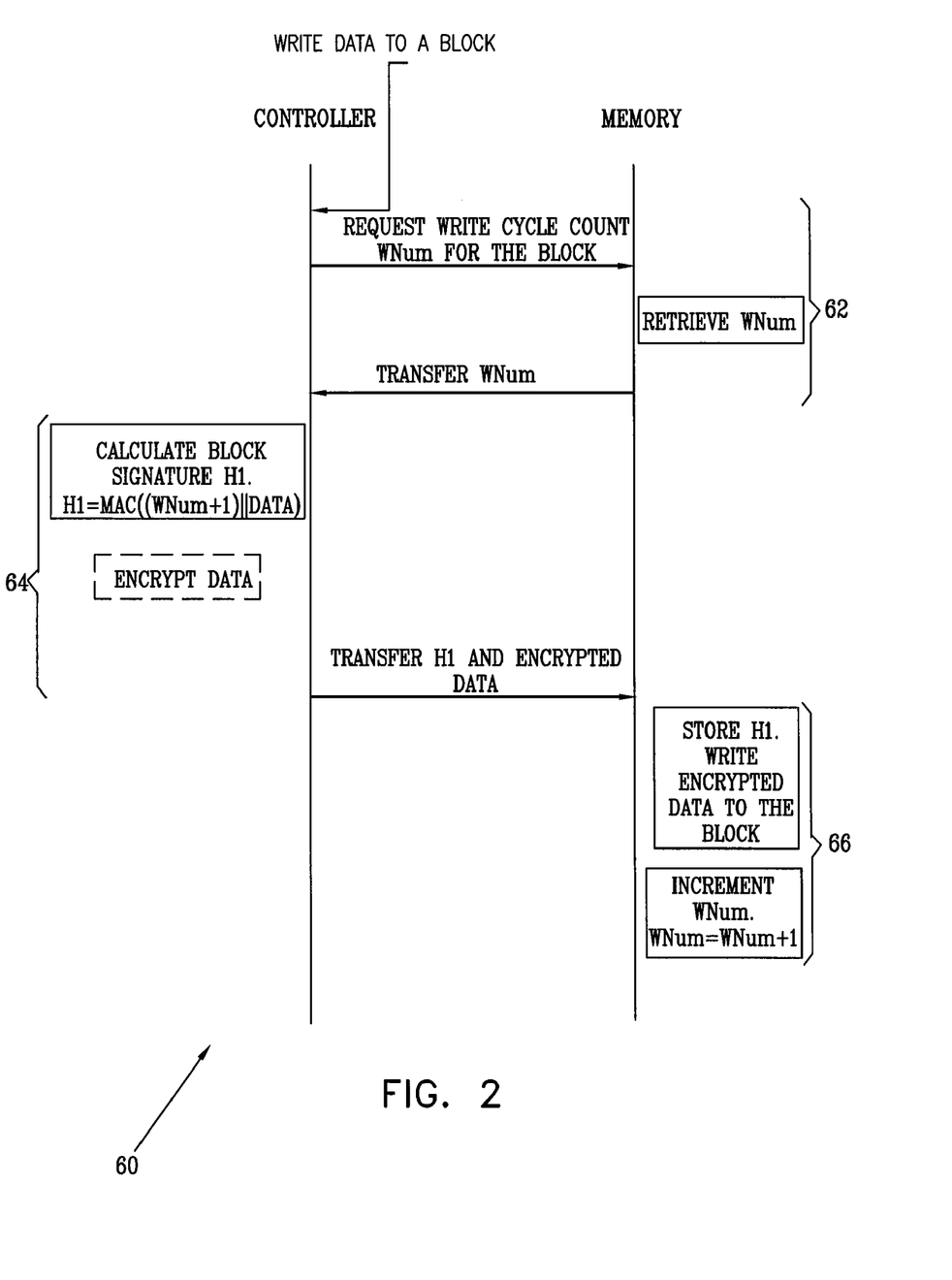
FIG. 2 is a schematic timing diagram of steps performed by a controller and a memory of the apparatus of FIG. 1, when data is written to the memory, according to an embodiment of the present invention.

FIG. 2 is a schematic timing diagram 60 of steps performed by controller 24 and memory 22, according to an embodiment of the present invention. Diagram 60 shows the steps performed when the controller writes data, herein also written as DATA, to a given block 49A of NVM 44.

In a first set 62 of steps the controller transmits to memory 22 a request for the write cycle count, WNum, of given block 49A. The value WNum for the given block is received from counts 43, and is transferred to controller 24, via interfaces 38 and 36, and bus 36, for temporary storage in RAM 32.

In a second set 64 of steps CPU 30 increments WNum. The incrementation may be by any convenient value, or function, that is used by the CPU and circuitry 40. Herein the incrementation is assumed, by way of example, to be 1, so that WNum increments to (WNum+1). The CPU concatenates DATA with (WNum+1), forming concatenated data ((WNum+1)||DATA). Engine 26 calculates a signature H1=MAC((WNum+1)||DATA) for the concatenated data, by operating the engine's algorithm using secret key 33. In addition, CPU 30 encrypts DATA to form enc(DATA), using cipher block 28.

In a final set 66 of steps the controller transmits signature H1 and enc(DATA) to memory 22. A copy of signature H1 is written as a signature 45A into signatures 45, and encrypted data enc(DATA) is written as data 47A into block 49A of the NVM. In addition, circuitry 40 increments count WNum to (WNum+1), and the incremented count for the given block is stored as a count 43A in counts 43.

Figure 3:
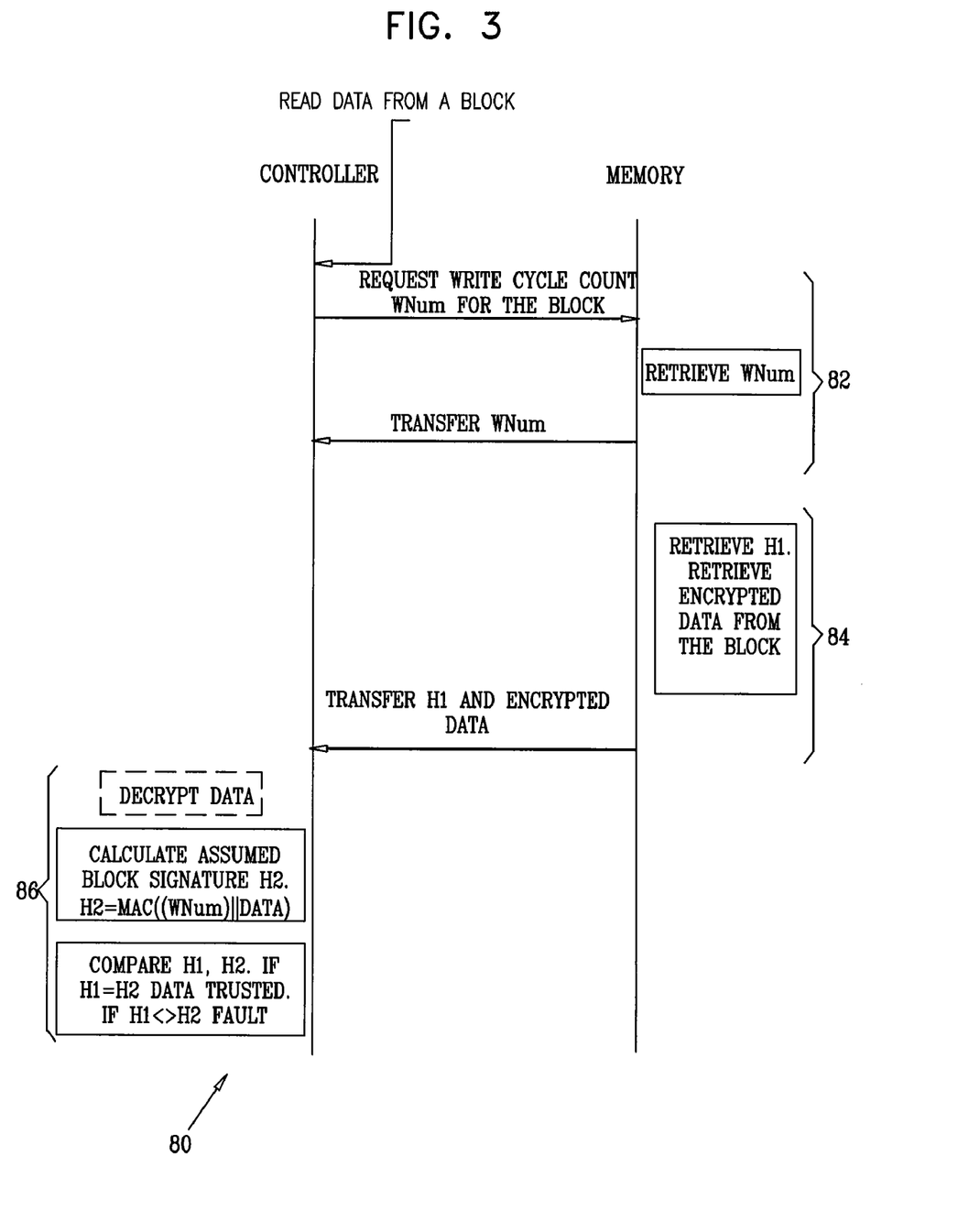
FIG. 3 is a schematic timing diagram of steps performed by the controller and memory when data is read from the memory, according to an embodiment of the present invention.

FIG. 3 is a schematic timing diagram 80 of steps performed by controller 24 and memory 22, according to an embodiment of the present invention. Diagram 60 shows the steps performed when the controller reads data from a block of NVM 44. The data to be read is assumed to have been stored as encrypted data enc(DATA) in block 49A, as described above with reference to FIG. 2.

In a first set 82 of steps, substantially the same as set 62, a current value of WNum, i.e., count 43A, for block 49A is transferred to RAM 32 in controller 24.

In a second set 84 of steps the signature H1 for block 49A is retrieved from signature 45A in signatures 45. The encrypted data enc(DATA) stored in the block is also retrieved. Signature H1 and encrypted data enc(DATA) transfer to controller 24 for temporary storage in RAM 32.

In a final set 86 of steps CPU 30 decrypts the encrypted data, using cipher block 28, to generate DATA. The CPU concatenates DATA with the value WNum, forming concatenated data ((WNum)||DATA). Engine 26 uses the concatenated data and key 33 to calculate an assumed signature H2=MAC((WNum)||DATA) for the concatenated data. CPU 30 then verifies that H1 and H2 are identical by comparing H1 (temporarily stored in RAM 32) with the calculated value H2. If the two values are identically equal, the CPU assumes that DATA is correct, and can be trusted. If H1 and H2 are not identically equal, the CPU assumes that DATA is not correct, and that a fault exists.

The following scenario assumes that apparatus 20 is used as an e-cash balance card, and describes a typical case where a fault may exist. A hacker reads enc(DATA) from memory 22 and stores the value for future use. The hacker uses the card, depleting the cash balance of the card, which is written to memory 22 as enc(DATA)'. The hacker then uses the stored value of enc(DATA) to overwrite enc(DATA)' with enc(DATA), intending to be able to use the card with its original cash balance. The action of writing causes circuitry 40 to increment the value of WNum, as described above in final set 66 of steps (FIG. 2). However, the value of H1 corresponds to the non-incremented value of WNum, so that when CPU 30 calculates H2 in final set 86 of steps (FIG. 3), it finds that H2 and H1 are not identical. Thus, circuitry 40 acts to safeguard the integrity of enc(DATA)'. enc(DATA)' in this case corresponds to the correct value of the balance in the e-cash card.

Figure 4:
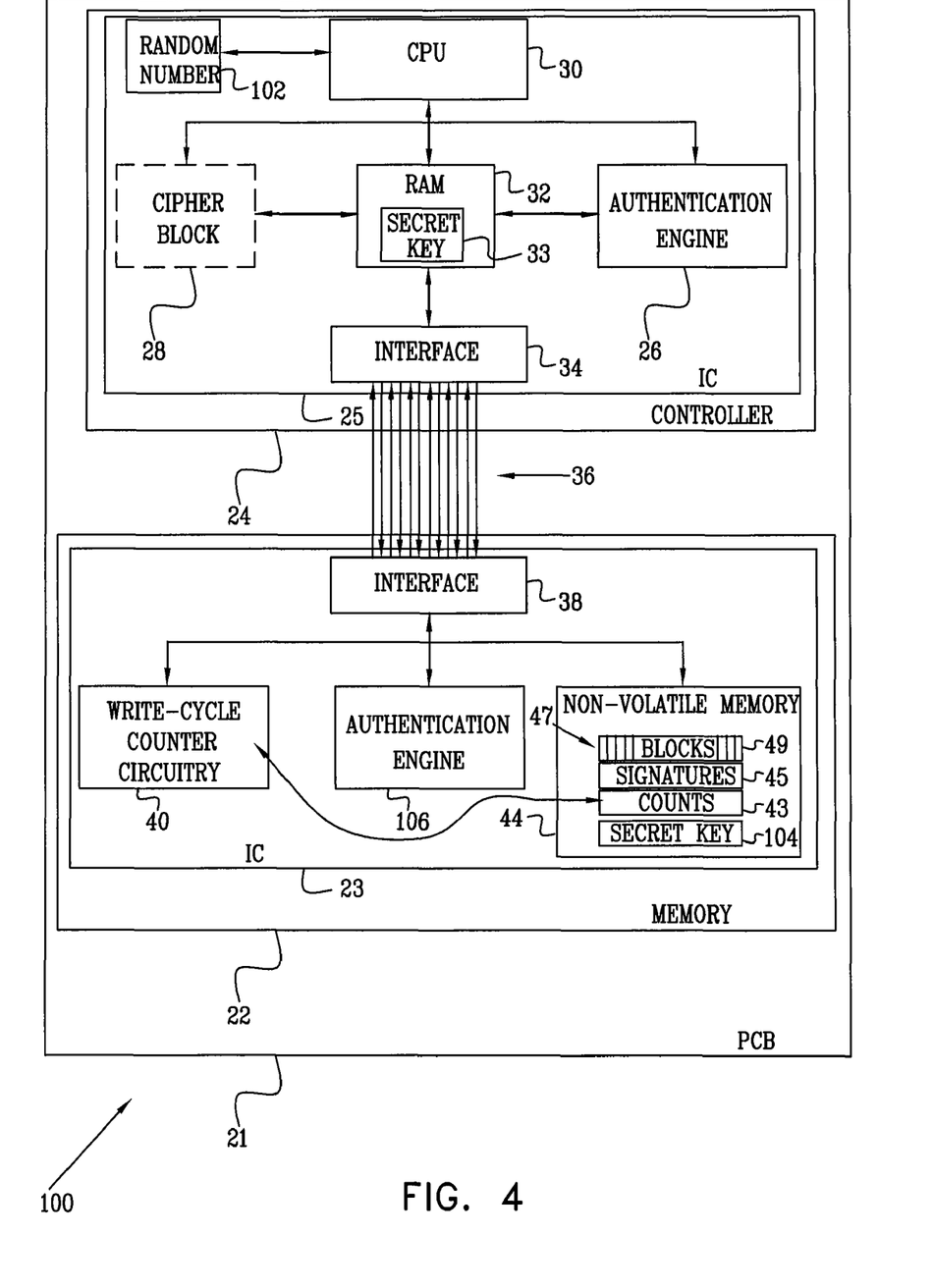
FIG. 4 is a schematic block diagram of an alternative data storage apparatus, according to an embodiment of the present invention.

FIG. 4 is a schematic block diagram of data storage apparatus 100, according to an embodiment of the present invention. Apart from the differences described below, the operation of apparatus 100 is generally similar to that of apparatus 20 (FIGS. 1, 2, and 3), and elements indicated by the same reference numerals in apparatus 20 and apparatus 100 are generally similar in construction and in operation.

In apparatus 100 controller 24 includes a random number generator 102. At the manufacturing stage of apparatus 100, a secret key 104, which is identical in value to secret key 33, is written to NVM 44 of IC 23. Alternatively, secret key 104 may be transferred into NVM 44 on initialization of apparatus 100. In apparatus 100 IC 23 also comprises an authentication engine 106, which may be implemented generally as engine 26, and which performs generally similar functions. Engines 26 and 106 perform generally the same function of generating a signature, but it will be understood that the methods of implementation of engine 26 in apparatus 20, and of engines 26 and 106 in apparatus 100, may be completely different. As is described below, incorporation of generator 102, key 104, and engine 106 into apparatus 100 eliminates the possibility that a hacker may determine the correct value of WNum.

Figure 5:
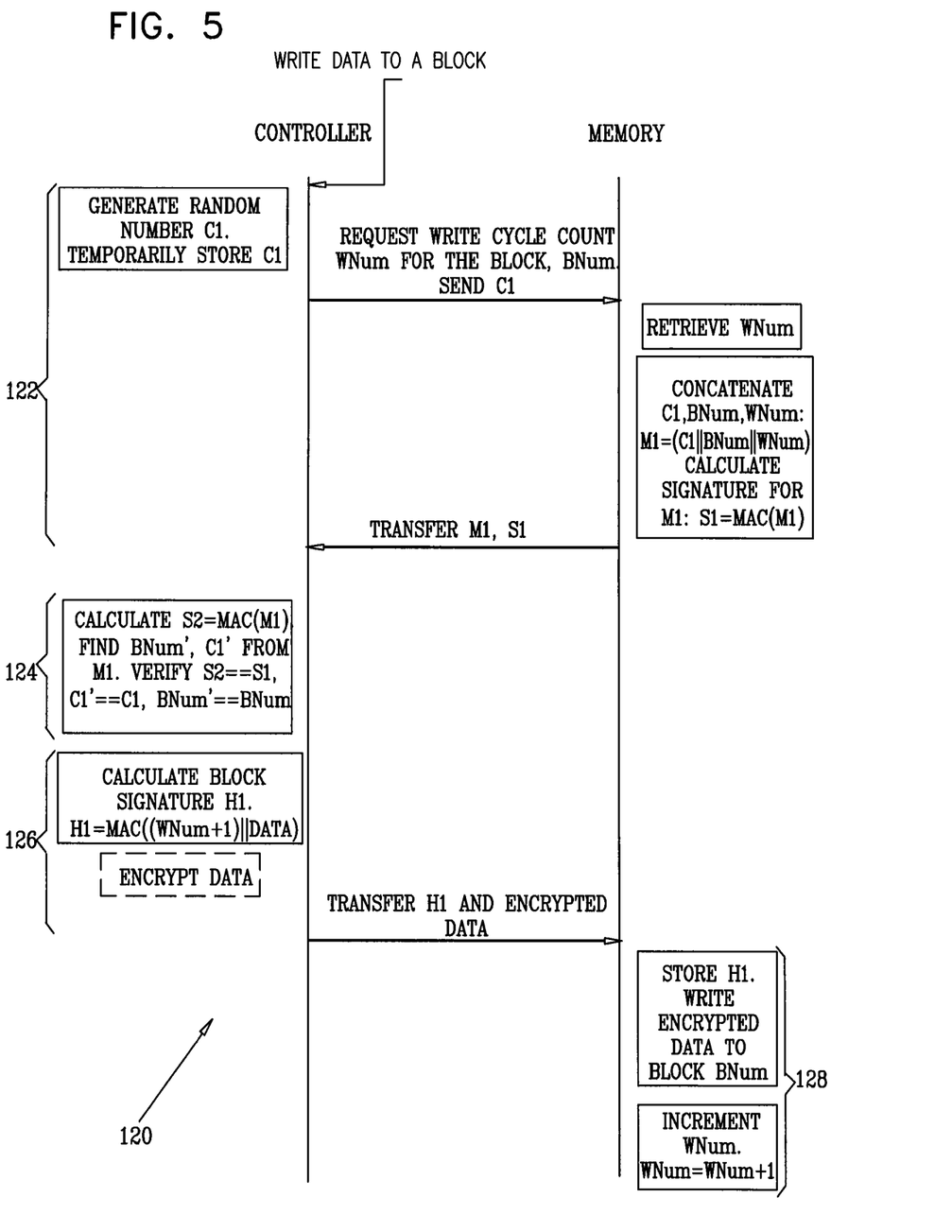
FIG. 5 is a schematic timing diagram of steps performed by a controller and a memory of the apparatus of FIG. 4, when data is written to the memory, according to an embodiment of the present invention.

FIG. 5 is a schematic timing diagram 120 of steps performed by controller 24 and memory 22, according to an embodiment of the present invention. Diagram 120 shows the steps performed when the controller writes DATA, in an encrypted form, to a block 49B, also identified as BNum, of NVM 44.

In a first set 122 of steps, CPU 30 uses random number generator 102 to generate a random number C1. The CPU temporarily stores C1 in RAM 32. CPU sends C1, and a request for the write cycle count 43B, also written herein as WNum, of block BNum to memory 22.

In memory 22 the value of WNum is retrieved from counts 43, and the memory forms a function M1 of parameters C1, BNum, and WNum. Hereinbelow, by way of example, M1 is assumed to comprise a concatenation of C1, BNum, and WNum, i.e., M1=(C1||BNum||WNum). However, M1 may comprise any other convenient function of C1, BNum, and WNum which is separable into its constituent parameters. Authentication engine 106 generates a signature S1 for M1, using secret key 104 and the algorithm incorporated in the engine: S1=MAC(M1).

The values of S1 and M1 are then transferred to controller 24. In one embodiment M1 is encrypted before transference, and decrypted by the controller.

In a step 124 CPU 30 uses engine 26 to calculate a signature S2 for the received value of M1, using secret key 33, i.e., engine 26 determines S2=MAC(M1). The CPU also recovers values C1', BNum', and WNum from M1, and checks if S2==S1, C1'==C1, and BNum'==BNum. If the three identities are valid, CPU 30 assumes that the value WNum is correct. If any of the identities are not valid, the CPU assumes that there is an error and does not proceed with the write process.

A set of steps 126 is generally similar to set 64 of steps described with reference to FIG. 2, so that set 126 concludes by CPU 30 transferring the signature H1 of block BNum, and the encrypted data enc(DATA), to memory 22.

In a final set of steps 128, generally similar to set 66 described above, a copy of signature H1 is written as signature 45B into signatures 45 and enc(DATA) is written into block 49B (BNum) as data 47B. In addition, in counts 43, WNum for block BNum is incremented to (WNum+1) and the incremented value is stored as count 43B.

Comparison of timing diagram 60 with timing diagram 120 shows that, unlike in the former timing diagram, in the latter timing diagram there is no transfer of WNum, in a readable form, between controller 24 and memory 22.

Figure 6:
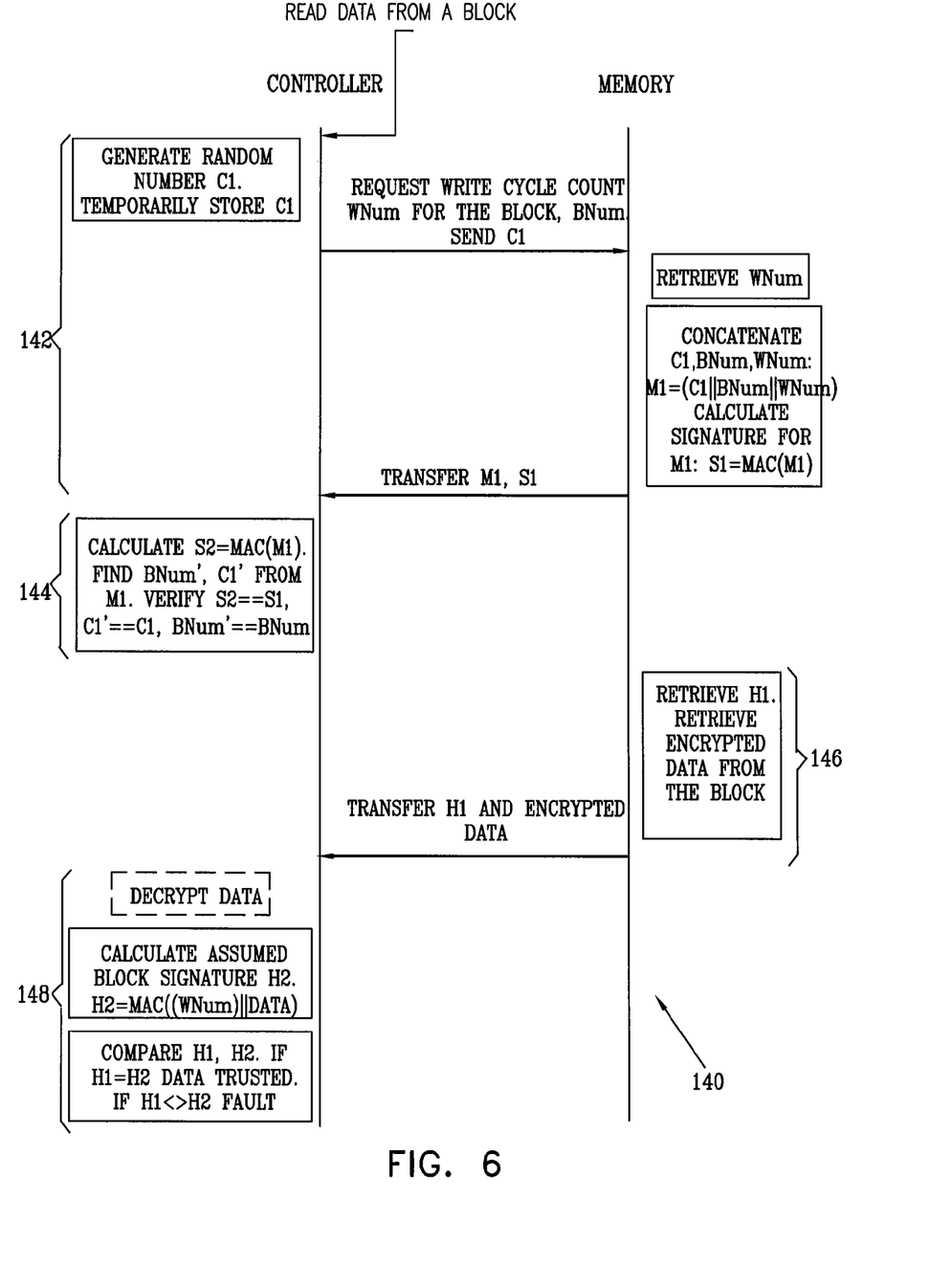
FIG. 6 is a schematic timing diagram of steps performed by the controller and memory of the apparatus of FIG. 4, when data is read from the memory, according to an embodiment of the present invention.

FIG. 6 is a schematic timing diagram 140 of steps performed by controller 24 and memory 22, according to an embodiment of the present invention. Diagram 140 shows the steps performed when the controller reads enc(DATA) from a block of NVM 44. The data to be read is assumed to have been stored in block 49B, BNum, as described above with reference to FIG. 5.

A first set of steps 142 is substantially similar to set of steps 122, beginning with the generation of a random number C1, and concluding with the transfer of M1 and S1 from memory A step 144 is generally similar to step 124, so that three identities S2==S1, C1'==C1, and BNum'==BNum are checked for validity. As for step 124, if the three identities are all valid, the read process proceeds. If any of the identities are not valid, CPU 30 assumes there is an error and does not continue with the read process.

A set of steps 146 is generally similar to set of steps 84 (FIG. 3). Thus, the signature H1 of block 49B is retrieved from signature 45B in signatures 45, and the encrypted data enc(DATA) stored in the block is also retrieved. The encrypted data and the signature transfer to controller 24.

A final set of steps 148 is generally similar to set of steps 86. Thus, after decrypting enc(DATA) to form DATA, CPU 30 concatenates DATA with WNum. Engine 26 calculates an assumed signature H2, MAC((WNum)||DATA), and compares H2 with H1. If H2 is identical with H1, the CPU assumes that DATA is correct, and can be trusted. If H1 and H2 are not identically equal, the CPU assumes that DATA is not correct, and that a fault exists.

Consideration of timing diagrams 120 and 140 shows that circuitry 40, by incorporating a count of write operations performed on memory 22, acts to safeguard the integrity of data stored in the memory. In addition, since the value of the count is not transferred in a readable form between the memory and controller 24, the count value is only available to the memory and the controller, and the integrity of the stored data can not be compromised.

The description above provides one example of how signatures are generated using a secret key. It will be understood that other forms of signature generation, and/or of encryption of data, may be used. Such other forms include, but are not limited to, simple encryption and asymmetric data encryption. The signatures formed may be stored in NVM 44 together with, or separately from, their respective data. Thus, a signature and its data may be stored in the same block of NVM 44, or alternatively in different blocks of the NVM. Typically, for backward compatibility with existing controller packages, it may be advantageous to store the signatures separately.

Secure transfer of data including the value of the write cycle count, between controller 24 and memory 22, may be effected by forms other than those described above. For example, in apparatus 100, rather than transferring M1 with a signature S1 from the memory to the controller (FIGS. 5 and 6), M1 may be encrypted at the memory, then transferred to and decrypted by the controller, without forming or transferring S1.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for storing data, comprising:
    writing the data to a non-volatile memory in a device comprising a memory package and a controller, wherein the memory package is separate from the controller and includes an integrated circuit containing a plurality of blocks of the non-volatile memory and counter circuitry;
    operating the counter circuitry to maintain a count of write operations performed on at least two blocks of the plurality of blocks of non-volatile memory;
    receiving at the controller the data and the count from the memory package;
    receiving at the controller prior counts of prior write operations from the memory package;
    generating, by the memory package, a signature which is a first function of the data and the prior counts;
    transferring the signature and the first function to the controller; and
    authenticating, by the controller, the data according to the signature.

2. The method according to claim 1, further comprising storing a copy of the signature in the memory package, and wherein authenticating the data according to the signature comprises verifying that the copy and the signature are identical.

3. The method according to claim 1, further comprising providing a random number to the memory package, and transferring a second function of the count, generated in response to the random number, from the memory package to the controller.

4. The method according to claim 1, further comprising storing a value of at least one count in the non-volatile memory.

5. The method according to claim 1, further comprising transferring at least one of the data and the counts between the controller and the memory package in a secure form.

6. A device for storing data, comprising:
- a memory package comprising an integrated circuit containing a plurality of blocks of non-volatile memory and counter circuitry; and
- a controller, the counter circuitry in the memory package being configured to maintain a count of write operations performed on at least two blocks of the plurality of blocks of non-volatile memory,
- the controller being configured to receive the data and the counts, as well as prior counts of prior write operations from the memory package, and the memory package being configured to generate a signature which is a function of the data and the prior counts and to transfer the signature and the function to the controller,
- wherein the controller is further configured to authenticate the data according to the signature and the function.

* * * * *